Patented Dec. 1, 1925.

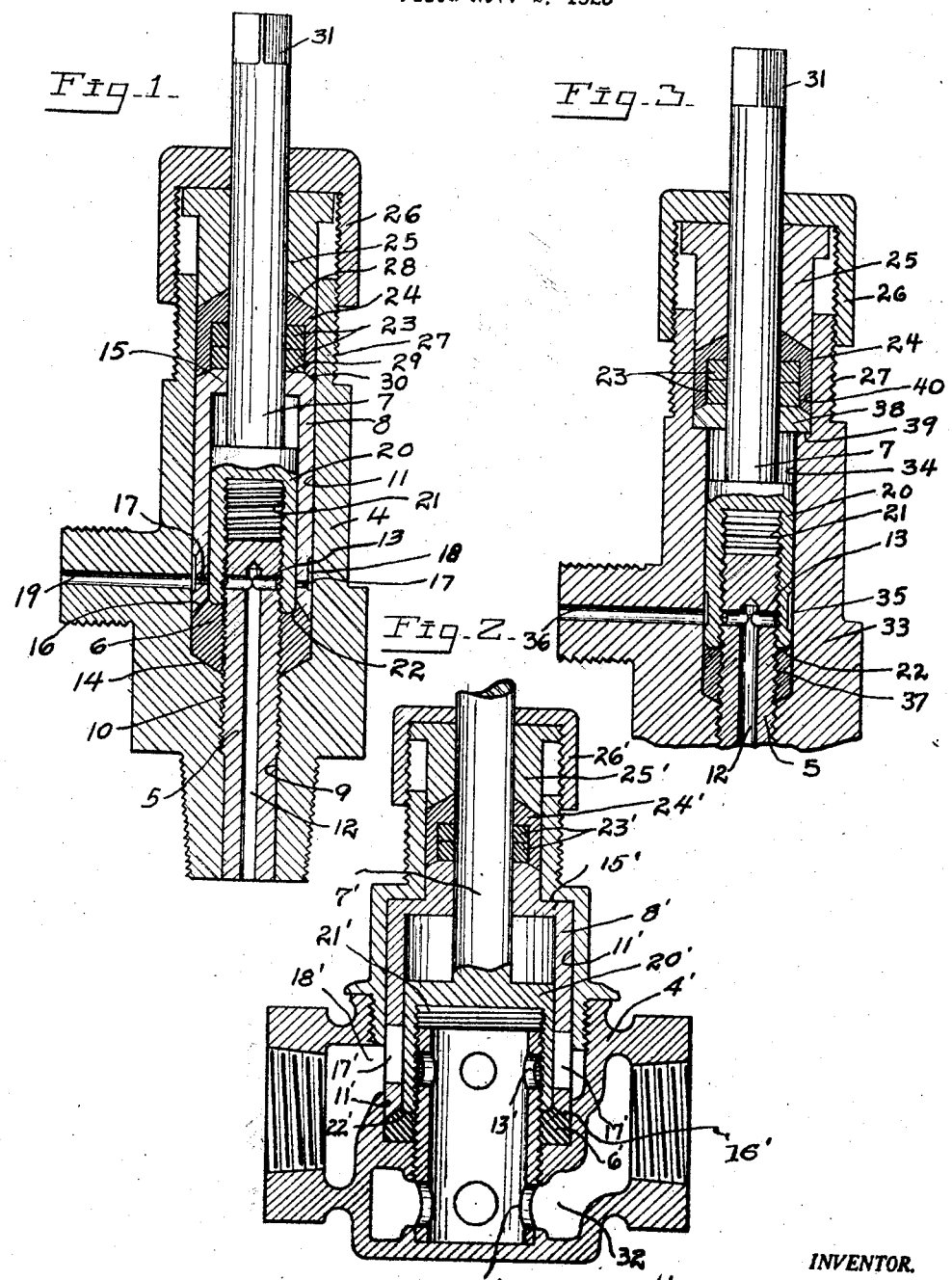

1,563,590

UNITED STATES PATENT OFFICE.

HERMAN W. ROTTEL, OF MILWAUKEE, WISCONSIN.

VALVE.

Application filed November 2, 1923. Serial No. 672,308.

*To all whom it may concern:*

Be it known that I, HERMAN W. ROTTEL, a citizen of the United States, and resident of Milwaukee, in the county of Milwaukee and State of Wisconsin, have invented a certain new and useful Improvement in Valves, of which the following is a specification.

The invention relates to valves, more particularly for tanks containing gases, such as oxygen, carbon dioxide, hydrogen, nitrous oxide, etc., under pressure, or for pipe lines for liquids under pressure.

I am aware that a seal employing extrudible metal on the valve or its seat has been proposed, but these are generally in the form of washers or shallow inserts and in operation the extrudible metal is forced into the passage controlled by the valve or is pressed out so that in a relatively short period its efficiency as a seal is lost. The object of my invention is to improve upon valves of the extrudible metal type by insuring that the passage controlled by the valve will not be clogged by extrudible metal, and further that the sealing metal will be kept at substantially the same height for long periods of time.

A further object of the invention is to provide a valve of the extrudible metal sealing type in which any dirt lodging on the seat will be actually forced into the metal forming the seat, and one in which the adjustments may be effected from the outside.

A further object of the invention is to provide a valve in which the sealing pressure exerted by the valve on its seat is also used to maintain the packing for the stem in good sealing contact therewith.

The invention further consists in the several features hereinafter set forth and more particularly defined by claims at the conclusion hereof.

In the drawings: Fig. 1 is a vertical sectional view of a valve, for tanks and the like, embodying the invention; Fig. 2 is a vertical sectional view of a valve, for pipe lines, embodying the invention; Fig. 3 is a view similar to Fig. 1 showing a modified form.

In Fig. 1 the valve structure includes a casing 4, a conduit 5, a seat 6 of extrudible metal, a valve member 7, a seat-adjusting member 8, and a stuffing-box for the stem of the valve 7.

The casing 4 is provided with a bore 9 threaded for a portion of its length and receiving the conduit 5 which is threaded to tightly fit the threads 10 formed in the bore 9, and its outer end is also preferably exteriorly threaded and projects into the valve chamber formed by the bore 11 of larger diameter than the bore 9. This conduit 5 has a passage 12 extending from the inlet end of the casing to transverse passages 13. The inner end 14 of the bore 11 is tapered or inclined downwardly toward the bore 9 and the extrudible metal forming the seat 6 is disposed in the cavity formed at the inner end of the bore 11 and between it and the conduit 5. It is especially to be noted that the level of the seat 6 is below or spaced from the outlet passages 13.

The seat adjusting member 8 is in the form of a sleeve having an inwardly extending annular flange 15 at its outer end and an outwardly inclined or tapered inner edge 16 tightly held against the extrudible metal forming the seat 6. This sleeve member 8 has passages 17 therein whose centers are in substantially the same plane as the center line of the passages 13, and the casing has an annular recess 18 formed therein adjacent the outer ends of these passages 17 to form an annular space in communication with an outlet passage or conduit 19 in the casing.

The valve member 7 has a cylindrical head 20 fitting within the sleeve member 8 and having a threaded bore 21 extending into it and engaging the projecting threaded end portion of the conduit 5, the inner edge 22 of said member 7 being rounded and adapted to tightly seat against the seat 6 when said member is screwed down to its closed position.

The stem of the member 7 projects through the opening in the flange 15 and is sealed against leakage by a stuffing-box including compressible packing rings 23, an extrudible metal packing ring 24, a follower 25, and a gland nut 26 interiorly threaded to engage the exteriorly threaded portion 27 at the outer end of the casing. The inner edge 28 of the follower or gland sleeve 25 is bevelled inwardly toward the stem of the member 7. The top of the flange 15 has a flat part 29 upon which the lower packing-ring 23 seats, and a bevelled part 30 against which the lower edge of the ring 24 abuts, the upper edge of said ring being engaged by the bevelled edge 28 of the follower. It will also be noted that the rings 23 are seated in an annular recess formed in the ring 24. Since the ring 24 is of relatively soft or extrudible metal and the rings 23 of compressible material, the tightening up of the nut 26 from the outside will cause the ring 24 to tightly engage the stem of the valve and the wall of the bore 11, and also exert pressure on the rings 23 and cause them to snugly engage the stem of the valve and thus seal the stem end of the valve structure against leakage.

As the gland nut 26 is tightened the pressure will be transmitted through the follower 25 and ring 24 to the sleeve member 8 and this acting against the metal in the seat cavity will tightly seal the joint between the seat and adjusting sleeve and, furthermore, this movement of the sleeve member 8 is also used to keep the seat 6 of extrudible metal at substantially the same height or level, that is, its normal level, for since the turning down of the valve 7 against its seat tends to depress the level of the seat by extrusion and causes or has a tendency to cause the sleeve member 8 to be moved outwardly, the inward movement of the sleeve, as above described, brings the seat 6 back to its normal level which, as has been previously noted, is below the outlet passages 13. Furthermore, since the pressure on the seat 6 by the valve member 7 causes an upward movement of the sleeve 8, this movement produces a tightening of the stuffing-box or sealing of the stem and upper end of the bore through the rings 23 and 24. It will also be noted that since the valve member 7 is in threaded engagement with the upper end of the conduit below the openings 13, when seating or seated, that it is impossible for the metal forming the seat 6 to work up into the passages 13 and clog them. When the valve member is turned up off its seat by a wrench engaging the squared end 31, the gas or liquid may pass from the tank or other device with which the valve is associated through the passages 12, 13 and 17 to recess 18 and thence through the passage 19.

The construction shown in Fig. 2 is practically the same as that just described and shows the adaptation of the invention to a valve for use in pipe lines where the pipes connect with the threaded ends of a casing 4' having an inlet passage 32 leading to an apertured sleeve or conduit 5', similar to the conduit 5, and secured to the casing 4' by threaded engagement therewith, and having its exteriorly threaded portion projecting into an outlet space 18' in the casing and provided with passages 13' leading from the interior of the conduit 5'. The casing 4' is here shown as made in two parts having alined cylindrical walls 11' forming a bore in which the sleeve adjusting member 8', similar to the member 8, is mounted, having passages 17' therein in communication with the space 18', a bevelled edge 16' contacting with the extrudible metal in the lower end of the bore 11' forming the valve seat 6' and an annular flange 15'. The valve member 7' has the same constructional features as the member 7, the head 20' working in the sleeve 8', the bore 21' threaded to engage the threaded end portion of the conduit 5', the lower edge 22' being rounded to tightly seat against the extrudible metal seat 6'. The stem of the valve member 7' is sealed by a stuffing-box similar to that described for the member 7, comprising the rings 23' of compressible packing material, the extrudible metal ring 24', the follower 25' and the gland nut 26'. The operation of this valve structure is the same as that previously described, the turning of the valve member 7' in one direction serving to seat it and in the other direction serving to open it so that liquid may flow from the space 32 through conduit 5', passages 13' to the space 18' and thence out of the casing. The action of the sleeve 8' upon the seat and the stuffing-box is the same as that described in connection with the structure of Fig. 1. As in the previous construction, the extrudible metal is prevented from working into the passages 13'.

In Fig. 3 the construction is similar to that of Fig. 1 except that the adjusting sleeve is omitted. The inlet conduit is the same as that for Fig. 1 and has similar reference characters applied thereto, and is similarly mounted in the casing 33 which is similar to the casing 4. The rotatable valve member is identical with that of Fig. 1 and is therefore similarly referenced. The head 20 in this form works in the bore 34 in the casing 33 which has an annular recess 35 adjacent the passages 13 and an outlet conduit 36. The cavity formed between the lower end of the bore 34 and the conduit 5 contains extrudible metal forming a valve seat 37 adapted to be engaged by the rounded edge 22 of the valve member 7. The stuffing-box for the stem is the same as that shown in Fig. 1 except that instead of the flange 15 a ring 38 is seated on a shoulder 39 formed between the bore 34 and the stuffing-box bore 40, the gland nut 26 serving to adjust the stuffing-box. As before noted, the extrudible seat 37 is disposed below the level of the passages 13 and the metal forming the seat is effectually prevented from working into said passages. The turning of the valve in one direction establishes communication between the passages 13 and the recess 35 and conduit 36 and by turning in the opposite direction the valve is screwed down tightly against its seat to closed position.

In all the constructions above described the valve may in closing exert such a pressure upon the extrudible metal seat as to actually force any foreign matter on the seat into the metal, and in those constructions using the adjusting sleeve, the level of the seat may be maintained substantially constant as the adjustment of the seat acts to push or press the metal up to the desired level. It will, of course, be understood that the conduits 5 or 5' are securely held against turning by the pitch direction of the threads and by the tightly compacted metal forming the seat.

I desire it to be understood that this invention is not to be limited to any specific form or arrangement of parts except in so far as such limitations are included in the claims.

What I claim as my invention is:

1. In a valve, the combination of a casing including a valve bore and an outlet passage, a conduit extending into said bore, an extrudible metal valve seat surrounding said conduit and spaced from its outlet and said outlet passage, and a longitudinally movable tubular valve member slidably fitting within said bore and its inner bore fitting over the extended end of said conduit and its outer end engageable with said seat.

2. In a valve, the combination of a casing including a valve bore and an outlet passage, a conduit having an exteriorly threaded portion extending into said bore, an extrudible metal valve seat surrounding said conduit and spaced from its outlet and said outlet passage, and a rotatable tubular valve member slidably fitting within said bore and having a threaded inner bore in engagement with said threaded portion of said conduit and turnable thereon to bring its outer end into engagement with said seat.

3. In a valve, the combination of a casing having a valve chamber, a conduit having an exteriorly threaded portion extending into said chamber, an extrudible metal valve seat surrounding said conduit and spaced from its outlet, a valve member in said chamber having a threaded bore in engagement with said threaded portion of said conduit and turnable thereon into engagement with said seat, and adjustable means in said chamber for acting upon said extrudible metal to bring its seat to its substantially normal level.

4. In a valve, the combination of a casing having a valve chamber, a conduit having an exteriorly threaded portion extending into said chamber, an extrudible metal valve seat surrounding said conduit and spaced from its outlet, a valve member in said chamber having a threaded bore in engagement with said threaded portion of said conduit and turnable thereon into engagement with said seat, a sleeve slidably mounted in said chamber and engageable with said extrudible metal to maintain the adjustment of said seat at substantially its normal level, and means for adjusting said sleeve.

5. In a valve, the combination of a casing having a valve chamber, a conduit having an exteriorly threaded portion extending into said chamber, an extrudible metal valve seat surrounding said conduit back from its outlet, a valve member in said chamber having a threaded head in engagement with said threaded portion of said conduit and turnable thereon into engagement with said seat, a sleeve slidably mounted in said chamber and engageable with said extrudible metal to maintain the position of said seat at substantially its normal level, and means, operable from outside the casing, for adjusting said sleeve.

6. In a valve, the combination of a casing having a valve chamber, a conduit having an exteriorly threaded portion extending into said chamber, an extrudible metal valve seat surrounding said conduit below its outlet, a valve member in said chamber having a head fitting over and engageable with said threaded portion of said conduit and turnable thereon into engagement with said seat, a sleeve slidably mounted in said chamber and having wedging engagement with said extrudible metal tending when moved to force it toward said conduit and thereby raise the level of said seat, and means for operating said sleeve.

7. In a valve, the combination of a casing having a valve chamber, an extrudible metal seat, a valve member movable longitudinally into sealing engagement with said seat, a stuffing-box for the stem of said valve member, and means between said seat and box for transmitting pressure to the box when pressure is applied by the valve member to said seat.

8. In a valve, the combination of a casing having a valve chamber, an extrudible metal seat, a valve member longitudinally movable into sealing engagement with said seat, a stuffing-box for the stem of said valve member, and a sleeve in said chamber between said box and seat for transmitting pressure to the box when pressure is applied by said valve member to said seat.

9. In a valve, the combination of a casing having a valve chamber, a conduit extending into said chamber, an extrudible metal valve seat surrounding said conduit and spaced from its outlet, a valve member in said chamber movable into engagement with said seat to close said outlet, and an adjustable sleeve within said chamber adapted to act on said seat to maintain its level substantially constant.

10. In a valve, the combination of a casing having a valve chamber, a conduit extending into said chamber, an extrudible metal valve seat surrounding said conduit, a valve member in said chamber movable into engagement with said seat to close said conduit, a sleeve within said chamber engageable with the extrudible metal seat, a stuffing-box for the stem of said valve member including an extrudible metal packing ring between said stem and the walls of said chamber and engaging said sleeve, and means for putting pressure on said ring.

11. In a valve, the combination of a casing having a valve chamber, a conduit extending into said chamber, extrudible metal surrounding said conduit and forming a valve seat, a valve member in said chamber movable into engagement with said seat to close said conduit, a sleeve within said chamber engageable with the extrudible metal, a stuffing-box for the stem of said valve member including an extrudible metal packing ring engaging said sleeve and flexible packing rings between a part of said metal ring and said stem, and means adjustable from outside the casing for putting pressure on said extrudible metal packing ring.

12. In a valve, the combination of a casing having a valve chamber, a conduit having an exteriorly threaded portion extending into said chamber, a body of extrudible metal surrounding said conduit below its outlet and forming a valve seat, a valve member in said chamber having a head fitting over and engageable with said threaded portion of said conduit and turnable thereon into engagement with said seat, a sleeve movably mounted in said chamber and having wedging engagement with said extrudible metal tending when moved to force it toward said conduit and thereby raise the level of said seat, and means for putting pressure on said sleeve including an extrudible metal packing ring between the stem of said valve and casing.

In testimony whereof I affix my signature.

HERMAN W. ROTTEL.